United States Patent
Hulseman et al.

(10) Patent No.: US 9,873,830 B2
(45) Date of Patent: Jan. 23, 2018

(54) PROPPANT FOR FRACKING FLUID

(71) Applicant: Hoowaki, LLC, Pendleton, SC (US)

(72) Inventors: Ralph Hulseman, Greenville, SC (US); Sarah Hulseman, Greenville, SC (US); Ernesto Fonseca, Houston, TX (US); Yinghui Liu, Katy, TX (US); Mauricio Farinas, Houston, TX (US); Michael Reynolds, Katy, TX (US)

(73) Assignee: Hoowaki, LLC, Greenville, SC (US)

( * ) Notice: Subject to any disclaimer, the term of this patent is extended or adjusted under 35 U.S.C. 154(b) by 104 days.

(21) Appl. No.: 14/692,343

(22) Filed: Apr. 21, 2015

(65) Prior Publication Data

US 2015/0307773 A1    Oct. 29, 2015

Related U.S. Application Data

(60) Provisional application No. 61/983,311, filed on Apr. 23, 2014.

(51) Int. Cl.
*C09K 8/80* (2006.01)
*E21B 43/267* (2006.01)

(52) U.S. Cl.
CPC .............. *C09K 8/80* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 8,006,759 B1 | 8/2011 | Cochran, Jr. et al. | |
| 2006/0048943 A1* | 3/2006 | Parker | C09K 8/68 166/308.1 |
| 2008/0053657 A1 | 3/2008 | Alary | |
| 2008/0135242 A1 | 6/2008 | Lesko et al. | |
| 2009/0255668 A1* | 10/2009 | Fleming | C09K 8/685 166/250.1 |
| 2011/0180259 A1 | 7/2011 | Willberg et al. | |

(Continued)

OTHER PUBLICATIONS

International Search Report for File PCT/US2015/026864, dated Jul. 2015.

(Continued)

*Primary Examiner* — John J Figueroa
(74) *Attorney, Agent, or Firm* — McNair Law Firm, P.A.; Douglas W. Kim

(57) ABSTRACT

This invention is a fracturing component and method having a fluid and a plurality of three dimensional structures mixed in the fluid wherein each structure has a longitudinal axis, center of mass and center of pressure wherein the center of mass and the center of pressure do not align in a stable manner causing the structure to flutter in the fluid to reduce the structure from settling out of the fluid when injected into a fissure. Each three dimensional structure can include a first end of the structure having a first plane having an angle of incident $\theta^1$ offset from perpendicular to the longitudinal axis and a second end of the structure having a second plane having an angle of incident $\theta^2$ offset from perpendicular to the longitudinal axis. The difference between $\theta^1$ and $\theta^2$ can be in a range of 0° to 65°.

23 Claims, 10 Drawing Sheets

(56) References Cited

U.S. PATENT DOCUMENTS

| | | | |
|---|---|---|---|
| 2012/0145390 A1* | 6/2012 | Parse | C09K 8/62 166/280.1 |
| 2013/0248191 A1* | 9/2013 | Nguyen | C09K 8/685 166/308.1 |
| 2014/0048262 A1* | 2/2014 | Worley | E21B 43/267 166/280.1 |
| 2014/0054035 A1* | 2/2014 | Nguyen | E21B 43/267 166/280.2 |
| 2014/0060828 A1* | 3/2014 | Nguyen | E21B 43/267 166/280.1 |

OTHER PUBLICATIONS

Eltilib et al., Investigation of the Particle Settling Velocity in Non-Newtonian Fluids. Journal Applied Sciences. 11:1528-1535. US, 2011.

Elgaddafi et al., Settling behavior of spherical particles in fiber-containing drilling fluids. Journal of Petroleum Science and Engineering. 84-85:20-28, 2012. US.

* cited by examiner

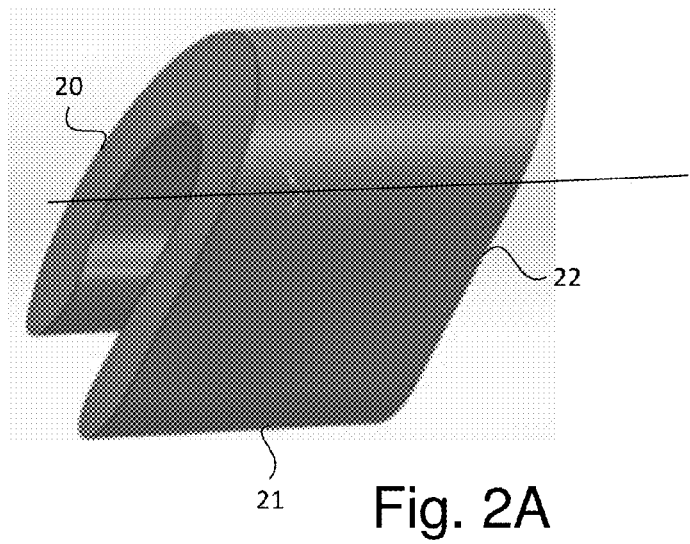
Fig. 2A
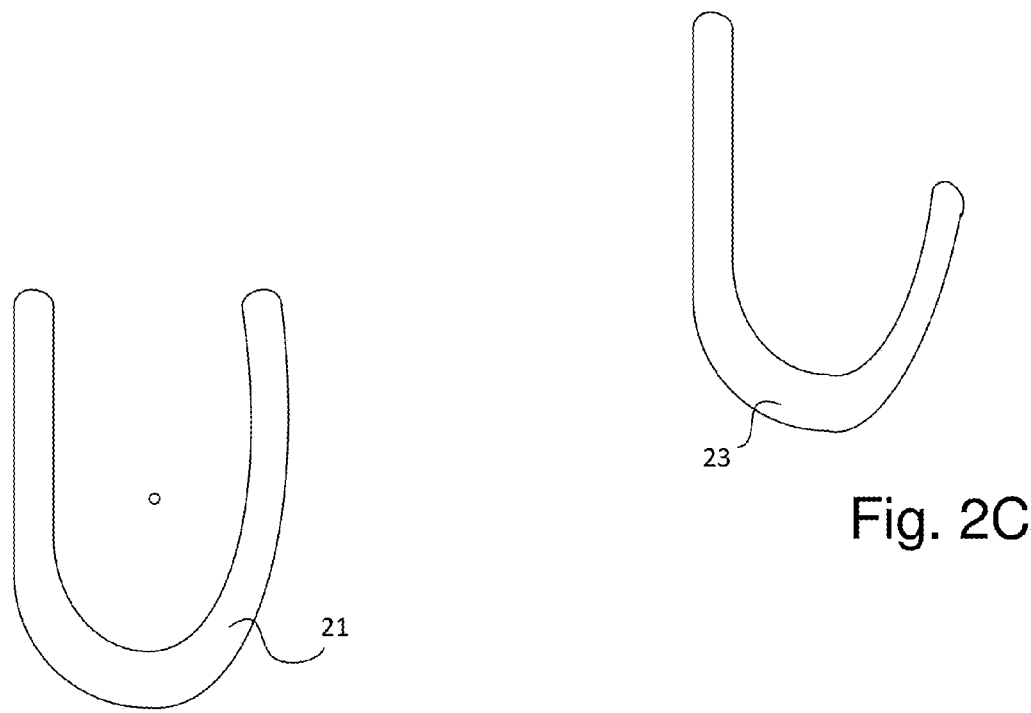
Fig. 2B
Fig. 2C

PROPPANT FOR FRACKING FLUID

BACKGROUND OF THE INVENTION

1) Field of the Invention

The present invention relates to proppant for use with fracking fluid having improved sedimentary properties and voids.

2) Background of the Invention

Natural gas production from shale gas reservoirs has shown a rapidly growing trend over the past decade and has become a significant source of U.S. domestic gas supply. In recent times, the combination of fracking with horizontal drilling technology as greatly improved the ability to extract natural gas form subterranean layers such as shale.

Fracking, sometimes called hydraulic fracturing, is a process that is used to extract natural gas from shale, particularly from relatively deep wells. With the improvements in horizontal drilling, used in conjunction with vertical drilling, highly pressurized fracking fluids can be injected into the shale layer of subterranean areas. This pressure can open or create fissures in the shale providing for a channel to allow for natural gas to flow into the wellbore as greater rates. When the pressure of the fracking fluid exceeds the fracture gradient of the rock or shale, the fracture is opened and/or extended.

When the pressure is removed from the fracture the fracture, due to the ambient pressures, tends to close of reseal. This reduces the amount or rate in which gas can escape into the wellbore. The productivity of a hydraulically fractured well depends on having a fracture which is effectively propped open over its length and height. Proppant is added to the fracking fluid so that the proppant can prop open these fissures. To achieve desired results, good or adequate proppant transport is a central issue in slickwater fracture treatments because of the low viscosity of the fracturing fluid. Proppant transport within a fracture is influenced by a number of factors including: fracture width, injection rate, fluid leak-off, fluid rheology, density difference between the fluid, friction, drag, and the physical properties of the proppant itself. It is also advantageous that the proppant have a sufficiently high crush strength so that the ambient forces of a fissure do not cause the proppant to crush thereby reducing the effectiveness of the proppant.

On attempt to reduce or eliminate the fracture closing is shown in U.S. Pat. No. 8,298,667 which is directed to a composition and method for making a proppant and utilizes a sphere. A significant disadvantage of using the sphere shape for a proppant is sedimentation. As the proppant travel through the fluid, the sphere tends to "settle" limited the distance that the proppant travels into the well and fissure. This sedimentation of proppant has historically been a limited factor in performance.

Further, the state of the art currently is to use sand, resin coated sand, lightweight ceramic, intermediate density ceramic or highly dense ceramic in an attempt to make a more desirable proppant and ultimately improve the production of a well. In several tests, ceramic offers superior performance to that of sand. Further, irregular shaped proppant seem to provide improved performance, however, these shapes are a product of irregularities in the proppant themselves and not a designed structured controlled proppant shape. Further, sand has the additional disadvantage of a lower crush strength making it less desirable as a proppant. Additionally, when proppant does crush, it breaks into smaller particles which can result in clogging the fracture, reducing the void in the proppant and reducing well production.

Recently, there has also been an attempt to improve proppant by using material that have a specific gravity from 1.7 to buoyant to reduce sedimentation and increase distribution of proppant throughout the well and its fissures. In PCT Patent Application PCT/2012/061329 at attempt at an improved proppant is disclosed as a ceramic ultra-lightweight porous proppant that can be used in fracking. This application states that silicon carbide and silicon nitride can advantageously provide a high degree of strength while having sufficient porosity to remain lightweight and facilitate fluid transport. Again, however, this reference discloses a spherical shape for the proppant.

U.S. Pat. No. 7,836,952 is directed to a proppant for use in a subterranean formation and is concerned with bridging of proppant and preventing proppant flow back. Flow back is when the proppant "flows back" into the wellbore during production, contaminates and clogs the wellbore and reduces oil production. Proppant that flows back also has to be separated from the oil before the oil is commercially useful. This reference is directed to the wellbore injection and designed to bridge the opening at the wellbore. Further, the designs of this reference include many edges which focus ambient forces and disadvantageously reduces the crush and compression resistance of the disclosed shapes.

In designing an optimal proppant, the time that the proppant remains suspended in the fluid is important so that the proppant does not settle out of the fluid preventing an advantageous amount of proppant from entering the fissure to a sufficient depth. The longer the proppant remains in the fluid and does not settle out, the deeper into the fissure the proppant can travel to prop open the fissure for gas and oil extraction. Therefore, the less sedimentation that occurs the more production the fissure can be for oil and gas production.

It is known that not all falling objects travel in a straight line in a fluid. Objects falling in a fluid can flutter, tumble or both based upon many factors. An object that has a shape to promote fluttering and/or tumbling will be suspended in a fluid longer thereby reducing sedimentation rates.

Accordingly, it is an object of the present invention to provide for a proppant with improved sedimentation rates and suspension in fluid.

It is another object of the present invention to provide for a proppant with a shape that promotes fluttering, tumbling or both.

SUMMARY OF THE INVENTION

The above objection are addressed by providing a proppant for use with fracking fluid comprising a plurality of three dimensional structures wherein each structure has a longitudinal axis, center of mass and center of pressure wherein the center of pressure and the center of mass do not align in a stable manner when settling in a fluid due to drag caused by frictional forces on the structure regardless of the orientation of the structure. The proppant can include at least one three dimensional structure is a cylinder having a bore. Each structure can have a width in the range of 100 µm to 3000 µm, wall thickness in the range of 100 µm to 400 µm, inner diameter in the range of 100 µm to 200 µm and length in the range of 100 µm to 3000 µm.

A plurality of structures can be included in a mixture of structures having a width in the range of 100 µm to 3000 µm, wall thickness in the range of 100 µm to 400 µm, inner diameter in the range of 100 μm to 200 μm and length in the range of 100 μm to 3000 μm. A first end of the structure can have a first plane having an angle of incident $\theta^1$ offset from perpendicular to the longitudinal axis; and, a second end of the structure can have a second plane having an angle of incident $\theta^2$ offset from perpendicular to the longitudinal axis.

The $\theta^1$ can be substantially equal to $\theta^2$ and the difference can be equal to or less than 30°. The difference between $\theta^1$ and $\theta^2$ for two structures can vary in a range of 25° to 65°. At least one structure can have a cross section selected from the group consisting of: an asymmetrical circle, a semi-circle, an asymmetrical semi-circle, a cross, a shape having an elongated center bar, I-beam and T. The drag coefficient can be greater than 2.3. The void defined by a plurality of structures can be greater than 30%. The structures can be manufactured by extrusion and selected from the group consisting of bauxite, bauxite compounds, alumina and mulite. The sedimentation rate in water can be at least 15% slower than the sedimentation rate of a cube made from the same material as the structures and with the same width of the structures. The sedimentation rate in water can be at least 45% slower than the sedimentation rate of a cube made from the same material as the structures and with the same width of the structures.

DESCRIPTION OF THE DRAWINGS

The following drawings and used to better explain and understand the invention and are part herein of the specification:

FIG. 2A is a perspective of aspects of the invention;
FIGS. 2B through 2D are cross sections of aspects of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

When the structure is in fracking fluid, it is desirable for the structure to engage in two motions to keep the structure suspended for as long as possible in the fluid to reduce sedimentation. The first motion that is desired is a side-to-side oscillation (flutter) and the second motion is an end-over-end rotation (tumble). When these two motions occur while the structure is traveling in a fluid stream, it is referred to as a flutter-tumble motion.

Figure 1A:
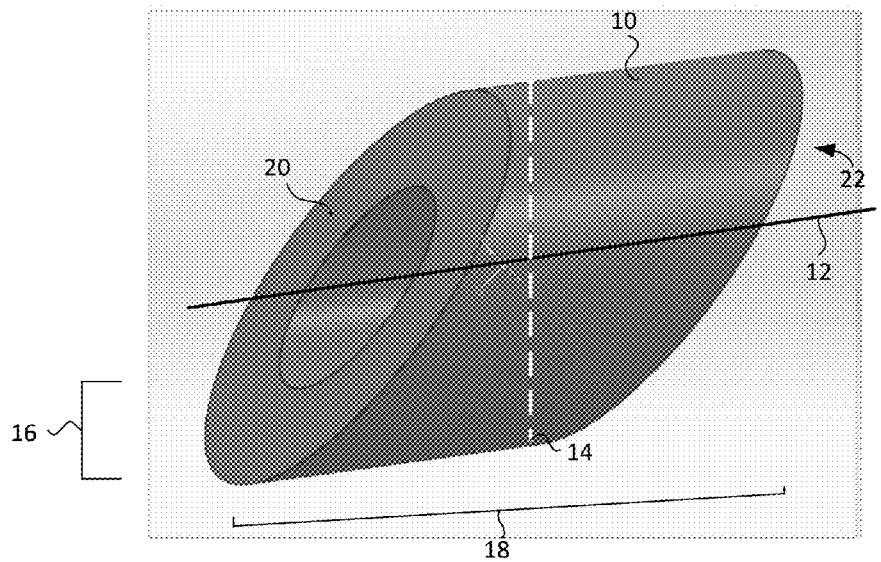
FIG. 1A is a perspective of aspects of the invention.
Figure 1B:
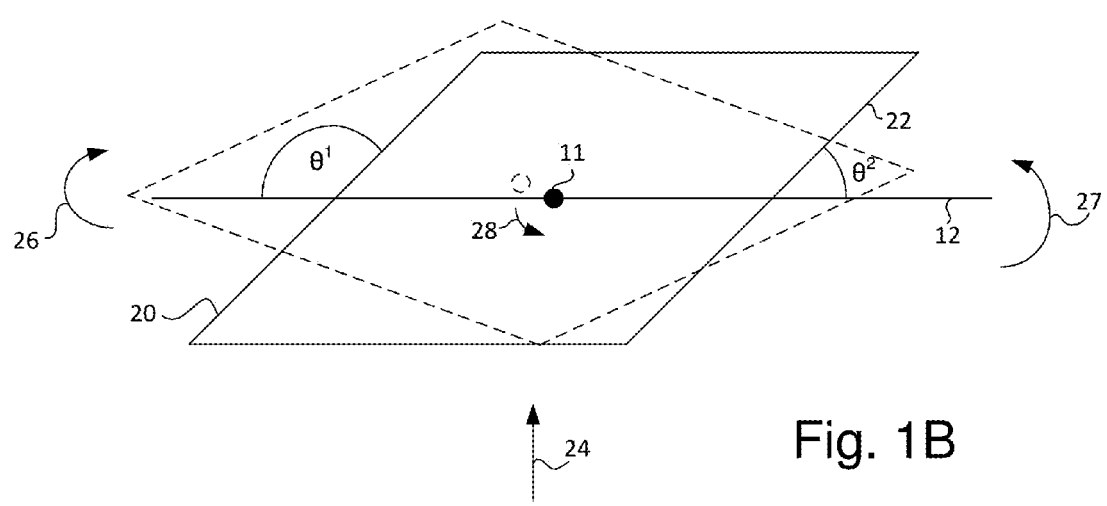
FIG. 1B is a cross section of aspects of the invention.

Referring to FIGS. 1A and 1B, this invention provides for structures (or particles) have a particular shape that when it is forced in the fluid stream, drag on the shape exerts a force 24 which attempts to rotate the shape in a direction shown as 26. The center of pressure is the point where the total sum of a pressure field acts on a body, causing a force to act through that point. The center of gravity is the point location where the weight of the components of the shape act. In one embodiment, the center of gravity 11 is shown. Once the shape so rotated, the second side 22 is effected by the force of the fluid stream and the shapes is rotated in a direction shown as 27. This causes the shape to flutter.

Additionally, when the shape is rotated, the center of mass can be moved out of equilibrium in relation to the center of pressure there is a desire of the shape to return to equilibrium which can assist in rotating the shape as shown in direction 28. The competing forces on the structure as it moves through the fracking fluid causes the structure to flutter thereby reducing sedimentation. In one embodiment, the outer wall and inner wall of the structure include microstructures.

In one embodiment, a three dimensional structure shown as a slanted cylinder proppant 10 having a longitudinal axis 12, an outer diameter 14, wall thickness 16, length 18, first side 20 and second side 22. The first and second sides can have a planar cross section. The first sidewall includes an angle $\theta^1$ and the second sidewall includes an angle $\theta^1$. In one embodiment, a first end of the structure has a first plane that has an angle of incident of $\theta^1$ in offset from perpendicular to the longitudinal axis. The second end of the stricture, opposite the first end in one embodiment, has a second plane that has an angle of incident of $\theta^1$ offer from perpendicular to the longitudinal axis. In one embodiments, $\theta^1$ is substantially equal to $\theta^2$ providing for a symmetry between the first sidewall and second sidewall. The angle $\theta^1$ and $\theta^2$ can be in the range of 25° and 65° and in one embodiment, equal to or less than 30°.

In one embodiment, the cylinder does not include a bore. This structure can include physical dimensions of width in the range of 100 μm to 3000 μm, wall thickness in the range of 100 μm to 400 μm, inner diameter in the range of 100 μm to 200 μm and length in the range of 100 μm to 3000 μm.

In one embodiment, the drag coefficient of the structures can be greater than 2.3. When the three dimensional shapes are deposited in the fissure, the shapes can stack upon each other. When this occurs the configuration of the shapes and the geometry of the shapes defines a void where in fluid in gas or liquid form can pass. In one embodiment, the void defined by a set of the three dimensional shapes disposed in a fissure is greater than 30%.

In manufacturing of the shapes, the extrusion process can be used resulting in solid shapes or shapes with a bore. Once extruded, the shapes can be further processed by laser cutting, scoring, or by passing through rollers or plates to further define the shapes. Material that can be used for the shapes includes bauxite, bauxite compounds, alumina and mulite.

Referring to FIG. 2A, one embodiment of the three dimensional structure 21 is shown having generally a "C" shape. The cross section can be a semi-circle shape or an asymmetrical cross section shape such as a "J" like shape shown as 23. In one embodiment, one of the legs of the shape is longer than the other which causes the structure of tumble as the competing forces of the center of pressure attempting to return to the center of mass when drag is exerted on the structure as it travels in fracking fluid. Additionally, the open design reduces the partial density which contributes to reducing sedimentation. In operation, the structure tends to flutter or tumble with the curved end downwards.

Figure 2D:
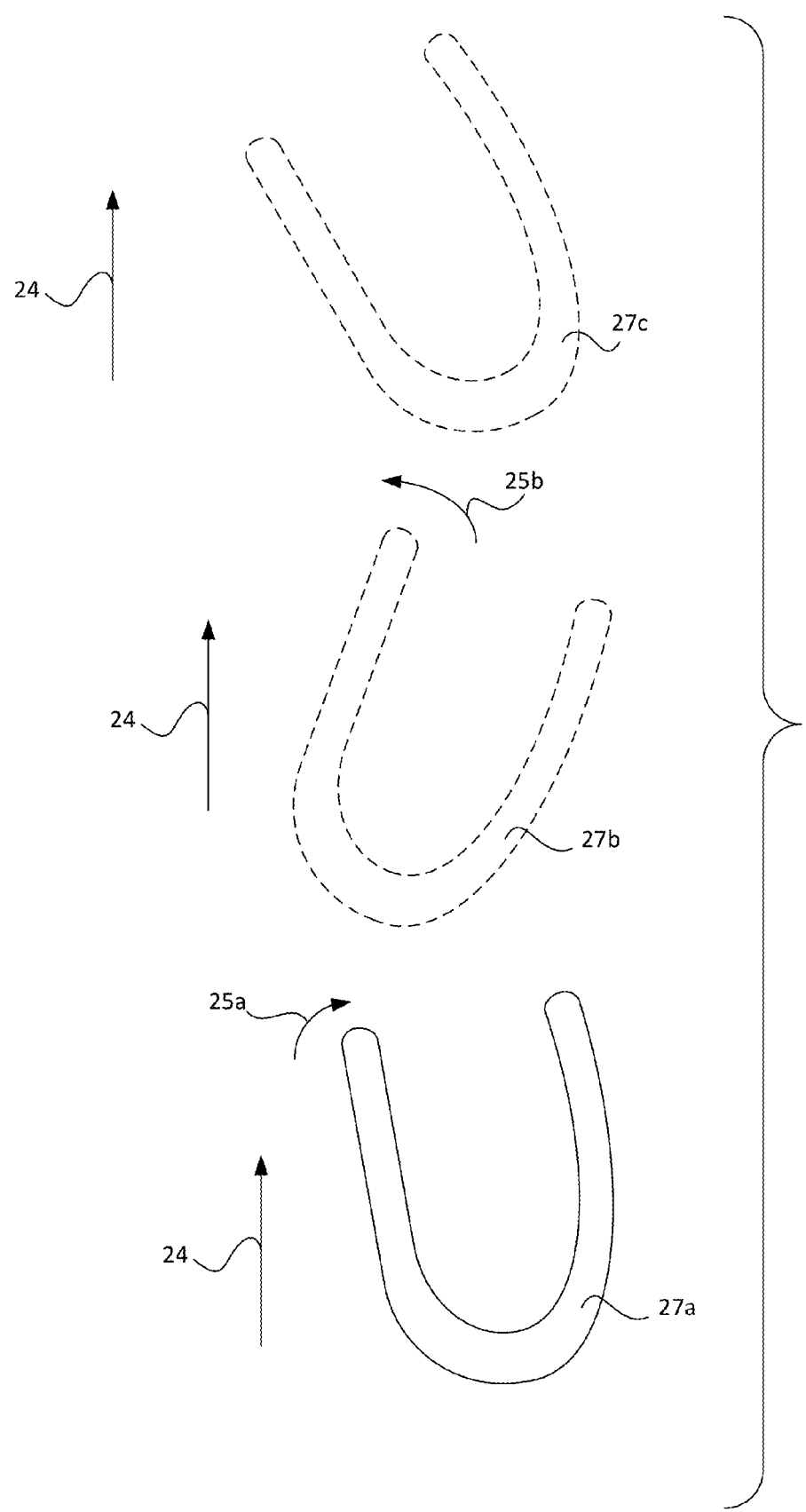
Figure 2E:
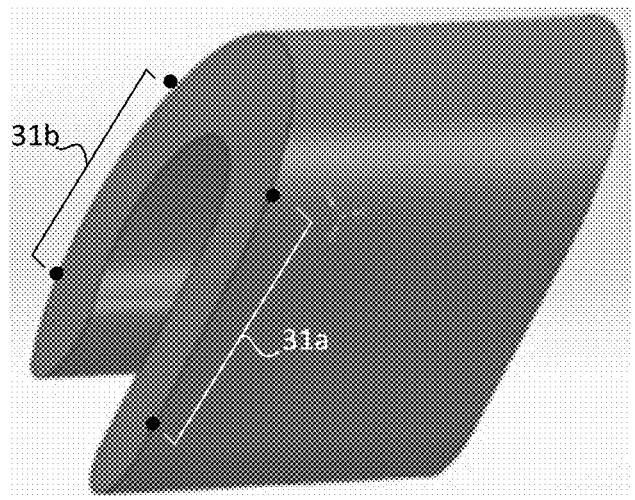
FIG. 2E is a perspective of aspects of the invention.

Referring to FIG. 2D, an asymmetrical "C" shape 27 is shown. In this embodiment, arms 29a and 29b are of differing length and can be is differing widths. When a force, such as the fluid stream 24, is exerted on shape 27a at one point in the fluid stream, the shape can be rotated on a direction shown as 25a due to the force of the stream. As the shape 27b is at another point in the fluid stream and after rotating, the shape has force 24 applied to the opposite arm causing the shape to rotate in a direction shown as 25b. As the shape 27c is at another point in the fluid stream and after rotating, the shape has force 24 applied to the opposite arm causing the shape to rotate in a direction shown as 25c. These forces and rotations cause the shape to flutter and/or tumble in the fluid stream reducing the tendency of the shape to settle out of the fluid stream. In one embodiment, one of the arms includes a portion 31a that has an arc AB that has a length longer than the arc CD of portion 32b of the second arm. Therefore, the shape of the structure shown in FIG. 2E is asymmetrical.

Figure 3:
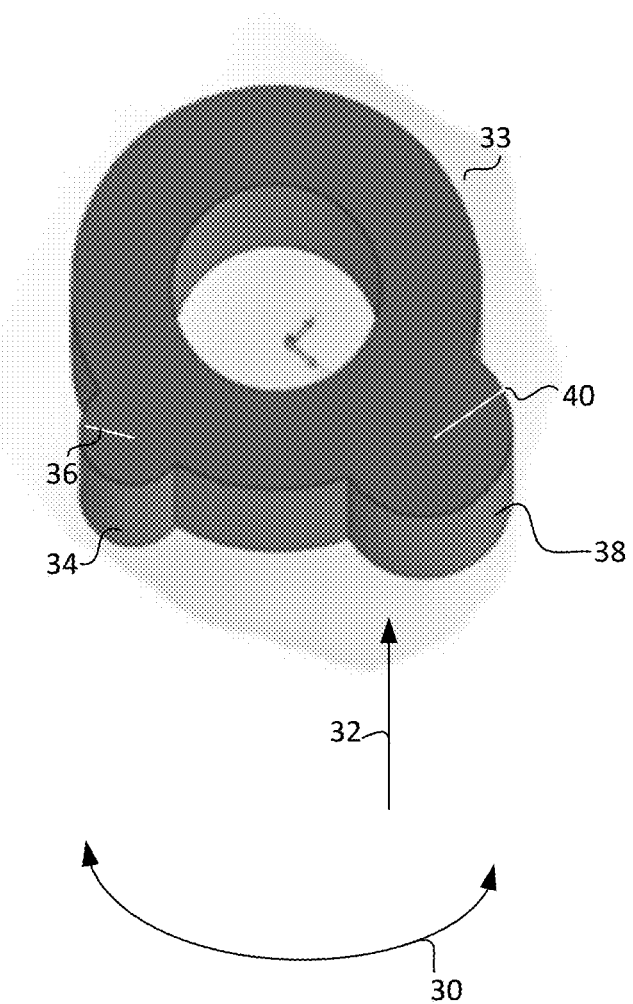
FIG. 3 is a perspective of aspects of the invention.

Referring to FIG. 3, a generally circular shape 33 is shown. The circular shape can include a first generally circular extension 34 having a radius 36. The circular shape can also include a second generally circular extension 38 having a radius of 40. When the shape is injected in a fissure, the circular extensions are acted upon by the force of the fluid flow causing the shape to flutter in direction 32. In one embodiment, the center of the first and second extensions are generally disposed on the perimeter of the circular shape. In one embodiment, the ratio of the area of the cross section of the circular shape to the area of the cross section of the smaller extension is about 4:1. In one embodiment, the ratio of the area of the cross section of the circular shape to the area of the cross section of the larger extension is about 2.4:1.

Figure 4A:
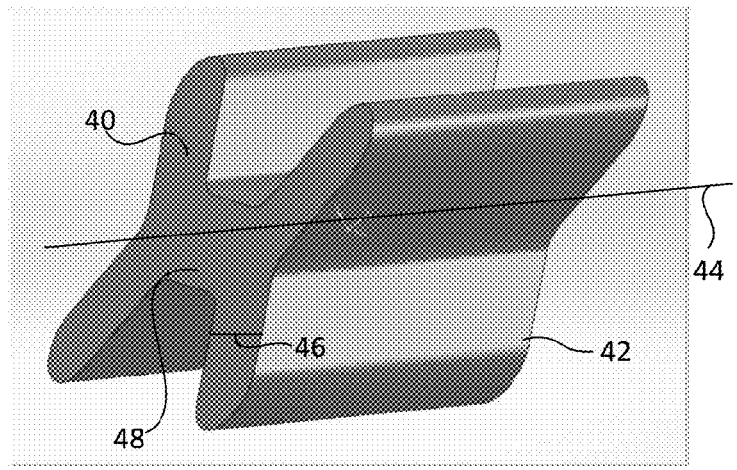
FIG. 4A is a perspective of aspects of the invention.
Figure 4B:
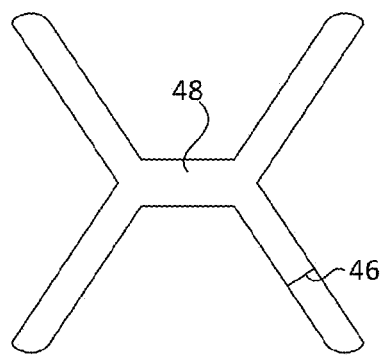
FIGS. 4B and 4C are cross sections of aspects of the invention.
Figure 4C:
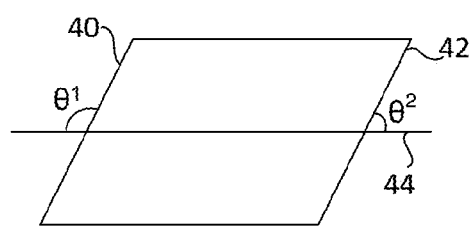
Figure 5:
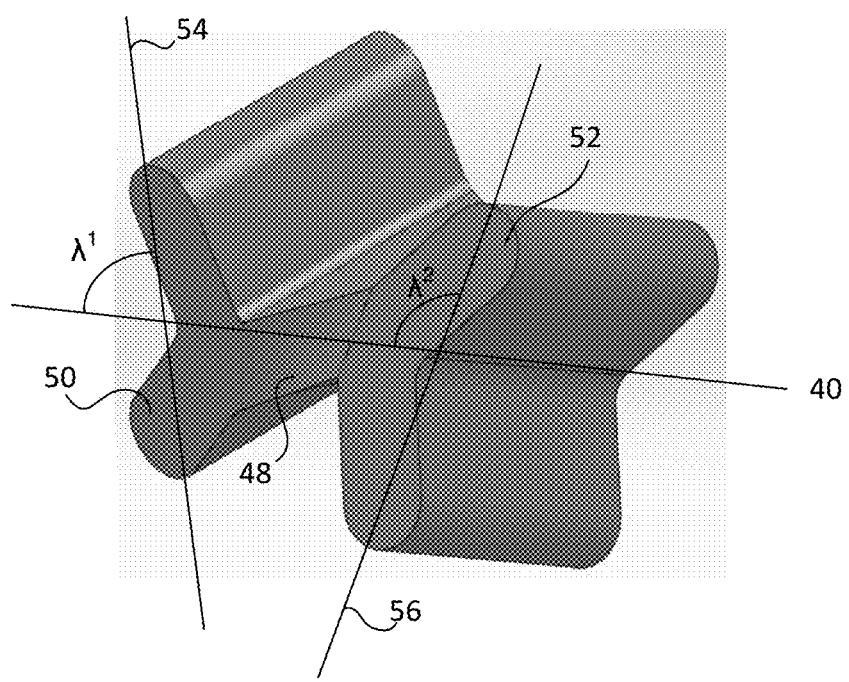
FIG. 5 is a perspective of aspects of the invention.

Referring to FIG. 4, a slanted H shape is shown. This structure includes the slanted sidewalls shown as 40 and 42. The angle between the slanted side wall 40 and a horizontal axis 44 is $\theta^1$ and the angle of the slanted wall 42 to the horizontal axis is $\theta^2$. In one embodiment, the thickness 46 of at least one arm is less than the thickness of the connector 48. The H shape, when force is exerted on it from the fluid stream, flutter or tumbles or both. Referring to FIG. 5, a twisted H shape is shown. The longitudinal axis 40 runs generally perpendicular to the sidewalls. A first pair of arms 50 can be attached to a second pair of arms 52 by connector 48. The connector can be offset in relation to the longitudinal axis. The first set of arms can include a slanted plane 54 that can be at an angle of $\lambda^1$ in relation to the longitudinal axis. The second pair of arms can include a slanted plane 56 that can be at an angle $\lambda^2$ in relation to the longitudinal axis. This shape, given the twisted orientation, will flutter, corkscrew, tumble or any combination when travelling in fracking fluid.

Figure 7A:
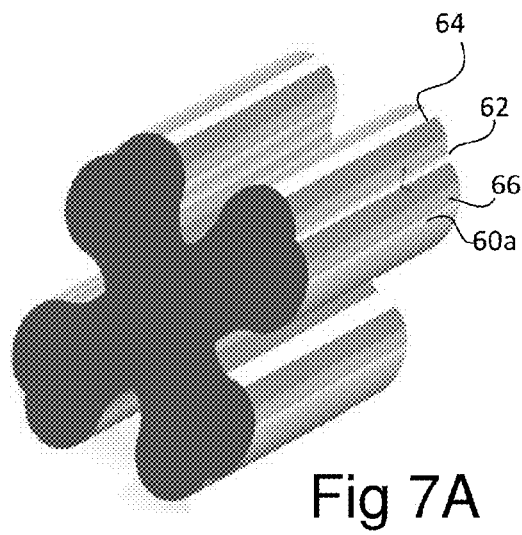
FIGS. 7A through 7C are perspectives of aspects of the invention, and,
FIG. 8 is a flowchart of aspects of the invention.
Figure 7B:
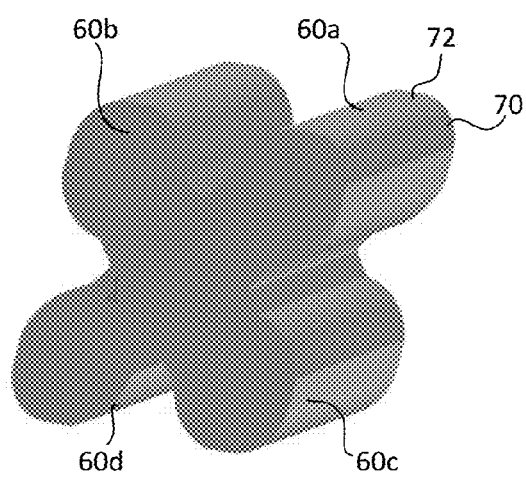
Figure 7C:
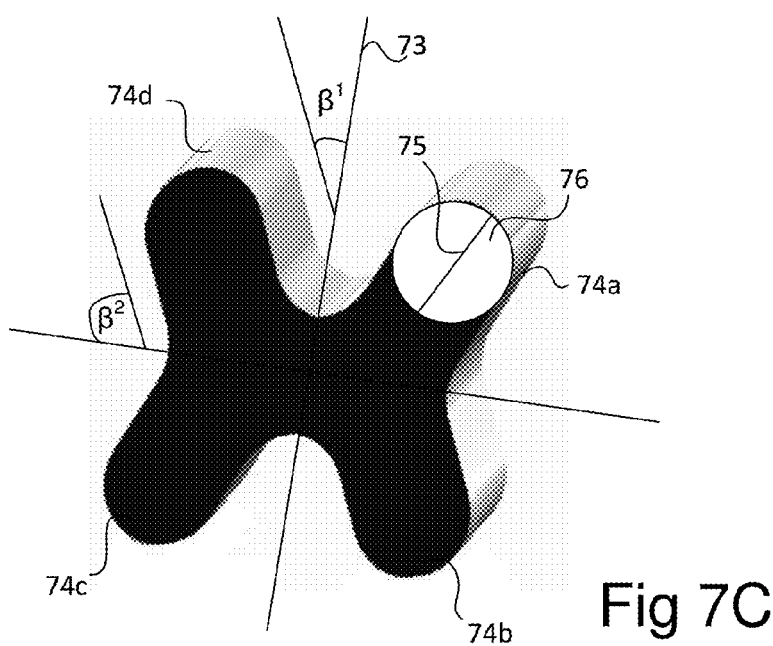

Referring to FIGS. 7A through 7C, alternative embodiments of the invention are shown. The shape of FIG. 7B has a generally cross cross-section with arms 60a through 60d extending from a center portion 68. The arms can include a radiused portion 70. The radiused portion can be circular, oblong or asymmetrical. The arm can include a flat portion 72. In one embodiment shown in FIG. 7A, arm 60a can include an indention 62 defined by a first radiused portion 64 and a second radiused potion 66. Each arm can include this configuration. Referring to FIG. 7C, the shape can be generally an H shape with arms having an angle $\beta^1$ in relation to a vertical axis 73. The angle $\beta^1$ can in less than 45°. The ends of the arms 74a through 74d can include a radiused portion 76. In one embodiment, the diameter 75 of the radiused portion can be greater than the length of the arm. In one embodiment, the arms can include angle $\beta^2$ in relation to a horizontal axis 78. The angle $\beta^2$ can be greater than 45°.

Using finite element analysis (FEA), the shapes of FIGS. 7A through 7C are further described. Using a pressure of 18,000 psi and filling a defined area of 0.5 mm by 0.5 mm with a cut face of 40° relative of the axis of extrusion, the shapes are tested for stress, strain and displacement. These shapes were compared with the shape shown in FIG. 4A with the following results:

| Stress, Strain and Displacement Results from FEA | | | | |
|---|---|---|---|---|
| Shape | Von Mises Stress (Max in MPa) | Displacement (Max in mm) | Strain (Max) | Projected cross-section area (mm$^2$) | Total Area (mm$^2$) |
| FIG. 7A | 1,151 | 5.45e–03 | 1.59e–03 | 0.1774 | 1.29 |
| FIG. 7B | 2,618 | 1.59e–03 | 3.47e–03 | 0.1813 | 1.35 |
| FIG. 7C | 3,403 | 1.94e–03 | 5.81e–03 | 0.1657 | 1.38 |
| FIG. 4A | 4,728 | 4.93e–03 | 5.11e–03 | 0.2626 | 2.59 |

The structures can be manufactured by extrusion and can be made from bauxite, bauxite compounds, alumina and mulite.

The following table provides the dimensions of each of the structure in one embodiment:

TABLE 1

| Dimensions of Structures | | | |
|---|---|---|---|
| Proppant Description | Outer Wall Diameter | Wall Thickness | Length |
| 2 Bump Cylinder Large Bump 0.25 mm diameter Small Bump 0.15 mm diameter | 0.575 mm | 0.14 mm | 0.5 mm |
| Slanted Cylinder 40° Side Walls | 0.575 mm | 0.14 mm | 0.5 mm |
| C - Shape 30° Side Wall Angle | 0.575 mm | 0.14 mm | 0.5 mm Long Arm 0.25 mm |
| Slanted H 30° Angle | | 0.14 mm | 0.5 mm 0.2 mm center length 0.2 arm length |
| Twisted H | | 0.14 mm | 0.5 mm 0.15 mm arm length 0.3 mm center length |
| Sphere 0.5 mm dimeter | | | |
| Cube | | | 0.5 mm long each side |

A sedimentation test was performed on all structures, using equal density material while keeping the overall particle dimensions about the same. The specific structure is soaked in water, dropped three feet into standing water without leaving the liquid medium with the time to fall the three foot distance measured in seconds. The results are shown in the following table:

TABLE 2

SEDIMENTATION TEST RESULTS (Alumina Particles)

| Proppant Description | Run #1 | Run #2 | Run #3 | Average | St. Dev | % Improvement of Cube | % Improvement of Sphere |
|---|---|---|---|---|---|---|---|
| 2 Bump Cylinder | 11.2 | 11.6 | 10.2 | 11.0 | 0.7 | 10% | −4% |
| Slanted Cylinder | 14.1 | 14.5 | 15.4 | 14.7 | 0.7 | 14% | 28% |
| Slanted C | 12.6 | 13.1 | 13.2 | 13.0 | 0.3 | 30% | 13% |
| Slanted H | 14.1 | 14.6 | 13.6 | 14.1 | 0.5 | 41% | 23% |
| Twisted H | 11.6 | 11.6 | 11.2 | 11.5 | 0.2 | 15% | 0% |
| Sphere | 11.4 | 11.4 | 11.7 | 11.5 | 0.2 | 15% | — |
| Cube | 10.2 | 9.6 | 10.1 | 10.0 | 0.3 | — | −13% |

Following are the test results from structures made from alumina when compared to the tradition proppant sand. The proppant particle sedimentation drag test results show a significant increase in fall time of alumina particles of the above structures of this invention when compared to that of the proppant sand, which had similar size and weight. The structures of fully dense alumina proppant particles were made to tumble and flutter during sedimentation in water. This movement reduces sedimentation rates greater than 40% compared to proppant sand particles of similar overall size and weight with ranges of the best three designs between 57% to 81%.

In one test, the structures, made from ceramic filled plastic having about a 1.65 g/cm³ material density were tested by soaking the particle in water for at least ten minutes, dropping the particle into a three inch diameter plastic tube filled with water with the time for the particle to fall to the bottom timed providing the following results:

TABLE 3

FALL TIMES

| Proppant Description | Average Fall Time#1 | Fall Direction and Comments |
|---|---|---|
| 2 Bump Cylinder | 11.0 +/− 0.7 | Particle falls with bumps facing down, rocks back and forth side to side as it falls |
| Slanted Cylinder | 14.7 +/− 0.7 | Falls with longest length perpendicular to fall direction; makes slow, large circles as it falls |
| Slanted C | 13.0 +/− 0.3 | Falls with round side down, rotates in large circles. |
| Slanted H | 14.1 +/− 0.5 | Falls with longest length perpendicular to fall |
| Twisted H | 11.5 +/− 0.2 | Falls either like an "H", wiggles to the sides OR falls with flat face down, top face wiggles side to side. |
| Sphere | 11.5 +/− 0.2 | Falls straight down without rotation |
| Cube | 10.0 +/− 0.3 | Falls straight without tumbling with one corner pointed down |

Figure 6:
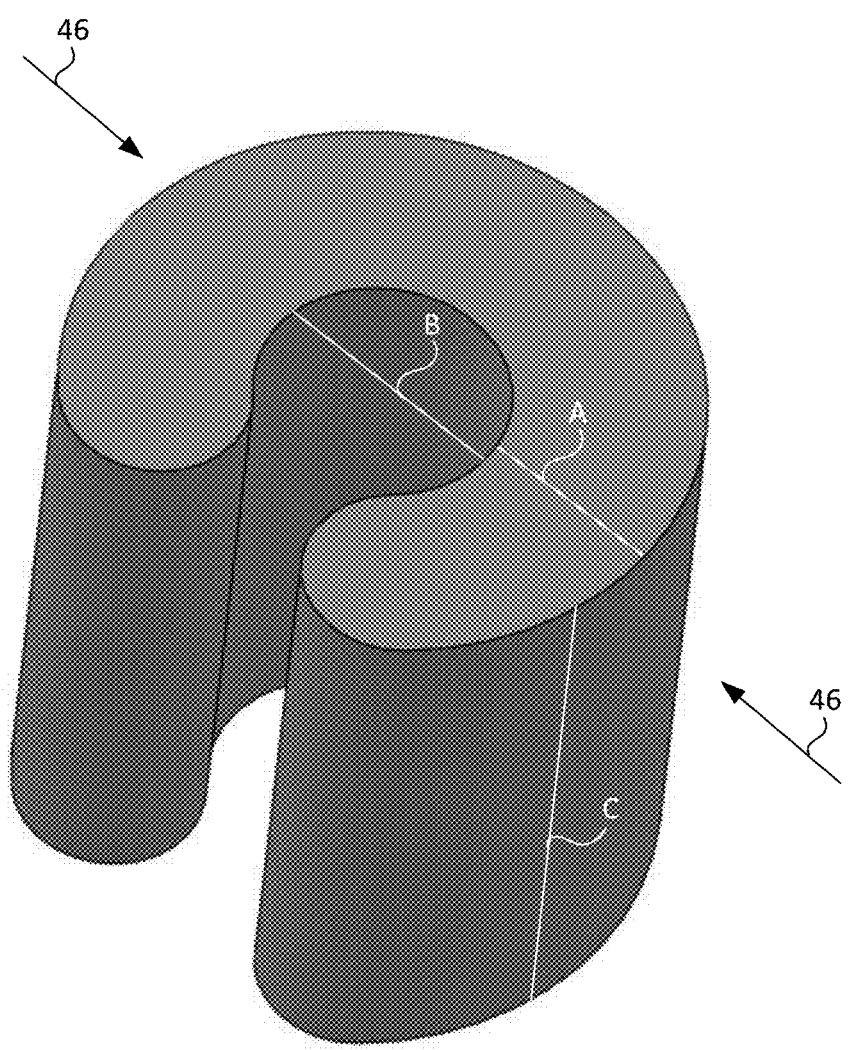
FIG. 6 is a perspective of aspects of the invention.

The Slanted C structure performed better than that of sand. Despite being 5 times heavier than sand, this structure, this design performed well with average fall times 13% to 23% faster than that of sand. The slanted hollow cylinder performed better than a cylinder without the slanted sidewalls. This demonstrates the effectiveness of adding slanted features to cause the particles to tumble. In one embodiment, the dimensions of the "C" structure are shown FIG. 6 as side A 500 μm, width B 150 μm and space C 200 μm. In one embodiment, at 6 ksi compression pressure shown as 45 on this structure would cause the structure to experience a nominal force of 2.3 lbs. For alumina with θ=360 ksi, one proppant particle as currently designed could withstand a force of 6 lbs, a safety factor of 160%. When the proppant particle experiences one break, it becomes 2 arched segments that retain a void. The drag coefficient can be about 2.3.

Figure 8:
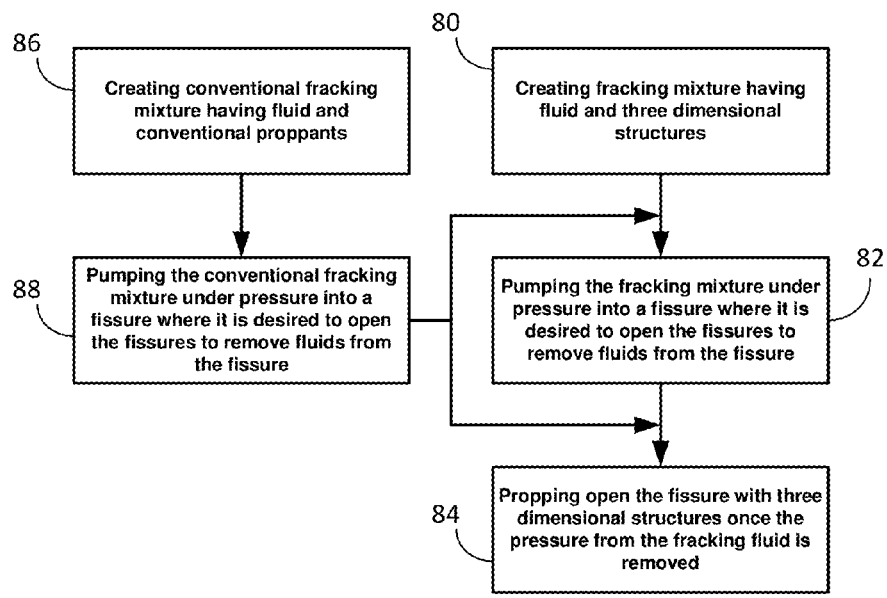

Referring to FIG. 8, the invention in operation is described. A fracking mixture is provided having a fluid and a plurality of three dimensional structures at 80. The three dimensional structures are carried in the fluid wherein each structure has a longitudinal axis, center of mass and center of pressure wherein the center of pressure and the center of mass do not align in a stable manner causing the three dimensional structure to flutter in the fluid transported by the fluid and injected into a fissure. The fracking mixture is pumped into a fissure at 82 under pressure to open subterranean fissures where it is desirable to remove fluids including gas and oil. Once the pressure is removed from the fluid, the three-dimensional structures can prop open the fissure at 84 so that gas or oil or both can be extracted from the fissure.

In one embodiment, a conventional mixture of fracking fluid and a conventional proppant can be created at 86. The conventional mixture can be pumped into the fissure under pressure at 88. In one embodiment, the conventional fracking fluid and proppant can be pumped into the fissure until at least 70% of the total volume of the fissure is filled prior to pumping in the fracking mixture with three dimensional structures. In one embodiment, pumping the conventional fracking mixture into the fissure can occur prior to pumping in the conventional mixture. In one embodiment, the ratio of three dimensional structures to conventional proppants in taken from the group consisting of: 0.5:10, 1:9, 2:8, 3:7, 4:6, and 5:5 parts per million.

When used as a proppant, the particles described herein may be pumped in a combination of stages with conventional proppants to achieve an optimum economical approach. For example, reducing the settling velocity may be possible while achieving, for example, taller propped fractures by first pumping 90% of the total volume of conventional proppant to fill the bottom of the fracture and followed with 10% volume of particles described herein at the end to bridge to the fracture and fill the top of the fracture. Various other ratios and methods may be employed depending on various factors such as well landing depths, location of the perforations, fracture thickness and type of fluid used. For example, one application may use 80% conventional proppant and 20% particles described herein or vice versa. Other combinations may have a 70%-30% split, a 60%-40% split, or a 50%-50% split. In some geologies it may be favorable to first pump particles described herein to achieve better propped heights if there are natural fractures thus reversing the order of the pumping. In other circumstances this pairings of particles described herein and conventional proppants may be pumped in more than a single series, such as 3, 7 or 10 series depending on the design and in concentrations ranging 0.5 ppg to 10 ppg, 1 to 9 ppg, 2 to 8 ppg or 3 to 7 ppg. Depending on the application, particles described herein may be separated by size, weight, or otherwise. Larger size distributions may be pumped in the beginning of a job at low concentrations.

It is understood that the above descriptions and illustrations are intended to be illustrative and not restrictive. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A fracturing component comprising:
a fluid; and,
a plurality of three dimensional structures mixed in the fluid, wherein each structure has a longitudinal axis, center of mass and center of pressure, wherein the center of mass and the center of pressure do not align in a stable manner, causing the structure to flutter in the fluid, to reduce the structure from settling out of the fluid, when injected into a fissure, wherein the plurality of three dimensional structures includes a mixture of structures having a width in the range of 100 μm to 3000 μm, wall thickness in the range of 100 μm to 400 μm, inner diameter in the range of 100 μm to 200 μm and length in the range of 100 μm to 3000 μm.

2. The fracturing component of claim 1 wherein at least one, three dimensional structure is a cylinder having a bore.

3. The fracturing component of claim 1 including:
a first end of the structure having a first plane having an angle of incident $\theta^1$ offset from perpendicular to the longitudinal axis; and,
a second end of the structure having a second plane having an angle of incident $\theta^2$ offset from perpendicular to the longitudinal axis.

4. The fracturing component of claim 3 wherein $\theta^1$ is substantially equal to $\theta^2$.

5. The fracturing component of claim 3 wherein the difference between $\theta^1$ and $\theta^2$ is equal to or less than 30°.

6. The fracturing component of claim 3 wherein the difference between $\theta^1$ and $\theta^2$ is in a range of 25° to 65°.

7. The fracturing component of claim 1 wherein at least one structure has a cross section selected from the group consisting of: an asymmetrical circle, a semi-circle, an asymmetrical semi-circle, a cross, a cross with bulging arms and a shape having an elongated center bar.

8. The fracturing component of claim 1 wherein at least one structure has a drag coefficient of greater than 2.3.

9. The fracturing component of claim 1 where a void defined by a set of three dimensional structures disposed in a fissure is greater than 30%.

10. The fracturing component of claim 1 wherein the three dimensional structures are manufactured by extrusion.

11. The fracturing component of claim 10 wherein the three dimensional structures are manufactured by laser cutting or scoring and passing through rolls or plates to create three dimensional structure with angled ends after extrusion.

12. The fracturing component of claim 1 wherein the three dimensional structures are made from materials selected from the group consisting of: bauxite, bauxite compounds, alumina and mulite.

13. The proppant of claim 1 wherein a sedimentation rate of the three dimensional structures in water is between 10% and 15% slower than the sedimentation rate of a cube made from the same material as the three dimensional structures and with the same width of the three dimensional structures.

14. The proppant of claim 1 wherein a sedimentation rate of the three dimensional structures in water is between 15% and 30% slower than the sedimentation rate of a cube made from the same material as the three dimensional structures and with the same width of the three dimensional structures.

15. The proppant of claim 9 wherein a sedimentation rate of the three dimensional structures in water is 30% and 41° A slower than the sedimentation rate of a cube made from the same material as the three dimensional structures and with the same width of the three dimensional structures.

16. A fracturing component comprising:
a fluid;
a plurality of three dimensional structures mixed in the fluid having arms extending away from a central point;
a first angle defined by the arm and a vertical axis that is less than 45°;
a second angle defined by the arm and a horizontal axis that is more than 45°;
wherein with each structure flutters in the fluid reducing the structures tendency to settle out of the fluid when injected into a fissure.

17. The fracturing component of claim 16 including a radiused portion included in each arm providing a rounded tip to each arm.

18. The fracturing component of claim 16 including:
a first end of the structures having a first plane having an angle of incident $\theta^1$ offset from perpendicular to the longitudinal axis; and,
a second end of the structures having a second plane having an angle of incident $\theta^2$ offset from perpendicular to the longitudinal axis.

19. The fracturing component of claim 16 having a von Mises results using FEA of about 1.150 MPA.

20. The fracturing component of claim 16 having a displacement result using FEA of about 5.45e-04 mm$^2$.

21. The fracturing component of claim 20 having a strain results using FEA of about 0.1775 mm$^2$.

22. A fracturing component comprising:
fluid; and,
a plurality of three dimensional structures carried in the fluid wherein each structure has a longitudinal axis, center of mass and center of pressure wherein the center of mass and the center of pressure do not align in a stable manner causing the three dimensional structure to flutter in the fluid, to reduce sedimentation while the fluid is being injected into a fissure, wherein the plurality of three dimensional structures includes a mixture of structures having a width in the range of 100 μm to 3000 μm, wall thickness in the range of 100 μm to 400 μm, inner diameter in the range of 100 μm to 200 μm and length in the range of 100 μm to 3000 μm.

23. The fracturing component of claim 22 including a void defined by the three dimensional structures is greater than 30% of the area occupied by the three dimensional structures when disposed in a fissure.

* * * * *